TIME DIVISION COMMUNICATIONS PROCESSOR

Filed March 14, 1968 4 Sheets-Sheet 1

INVENTORS
HERMAN L. BLASBALG
RENATO A. D'ANTONIO
HANN F. NAJJAR

BY Theodore E. Galanthay
AGENT

Nov. 17, 1970 H. L. BLASBALG ET AL 3,541,524

TIME DIVISION COMMUNICATIONS PROCESSOR

Filed March 14, 1968 4 Sheets-Sheet 2

United States Patent Office 3,541,524

Patented Nov. 17, 1970

3,541,524

TIME DIVISION COMMUNICATIONS PROCESSOR

Herman L. Blasbalg, Baltimore, Md., Renato A. D'Antonio, North Attleboro, Mass., and Hann F. Najjar, Silver Spring, Md., assignors to International Business Machines Corporation, Armonk, N.Y., a corporation of New York

Filed Mar. 14, 1968, Ser. No. 713,189
Int. Cl. H04j *3/00*
U.S. Cl. 340—172.5 5 Claims

ABSTRACT OF THE DISCLOSURE

A time division multiplex communications system capable of accepting data from a plurality of input channels at diverse and asynchronous rates, and for providing said data on a single time divided communications link at a new and synchronous data rate.

BACKGROUND OF THE INVENTION

Our invention relates to a time division multiplex communications system. More specifically, our invention relates to a time division multiplex communications system capable of receiving information from a plurality of asynchronous sources, and providing a single time division multiplexed output.

Briefly, time division multiplex communications systems in general are well known. For example, a number of data channels operating in synchronism (i.e. from a common timing source) can be multiplexed onto a single time division multiplexed communications link by any one of a number of well known multiplexors.

Additional problems, however, are introduced if the data rates of the various channels to be multiplexed are at a slow and fractional rate. By fractional data rate is meant a rate such as 42.87735644+ bits per second. It is more difficult to multiplex a number of input channels having data rates such as the just mentioned fractional rate with other rates such as 61.12 bits per second, 70 bits per second, etc. The multiplexing problem is further complicated if the various input channels do not operate from a common clock source, and are therefore not in synchronism.

SUMMARY OF THE INVENTION

Accordingly, it is an object of our invention to provide a time division multiplex communications system with means for multiplexing data from a plurality of input lines, where said data occurs at fractional rates.

A further object of our invention is to multiplex a plurality of input channels, where the data on each of these channels is asynchronous.

A still further object of our invention is to multiplex a plurality of input channels, each having a slow data rate which is close to the rate of each other channel.

Still another object of our invention is to provide a time division multiplexor with means for maintaining bit integrity.

In accordance with our invention, we provide a plurality of buffers, one for each of the input channels to be multiplexed. Data is received into these buffers according to the data rate and ime base of the particular channel. Data is arranged in each of these buffers on a "first in-first out" basis so that data enters and leaves each buffer continuously. As data is being read into each buffer at the rate of the particular input channel, it is also being read out of each buffer at a rate determined by the multiplex clock.

In this way, the apparatus of this invention multiplexes data from a number of independent and asynchronously operating input channels, and also buffers the data, which occurs at fractional bit rates, so as to maintain a constant transmission rate over the communications link while at the same time maintaining bit integrity.

Bit integrity, as will be explained in greater detail, is a feature permitting all bits to be transmitted in order of receipt. Since the data occurs at fractional bit rates, any consistent output rate always results in a remainder of bits left in the buffers. In order to maintain bit integrity, bits are processed through the buffer on a first-in first-out basis. Data is always sent over the communications link from the output of the buffers at an average data rate which is faster than the sum of the input bit rates, thereby accounting for the added dummy bits. At every gross interval (for example 100 seconds), the accumulated data bits are sent with the regular data bits, and a correspondingly fewer number of dummy bits. This has the effect of moving the input data rate forward two decimal places over the longer time interval. The remaining accrued data bits are transmitted at the end of the day after the data sources have been turned off. Keeping in mind that the buffers are continuous buffers operating in a "circular fashion," then the additional bits sent at the end of the day were the last bits to have been received from the data sources, thereby maintaining bit integrity.

The foregoing and other objects, features and advantages of our invention will be apparent from the following and more particular description of a preferred embodiment of our invention, as illustrated in the accompanying drawings.

GENERAL DESCRIPTION

Figure 1:
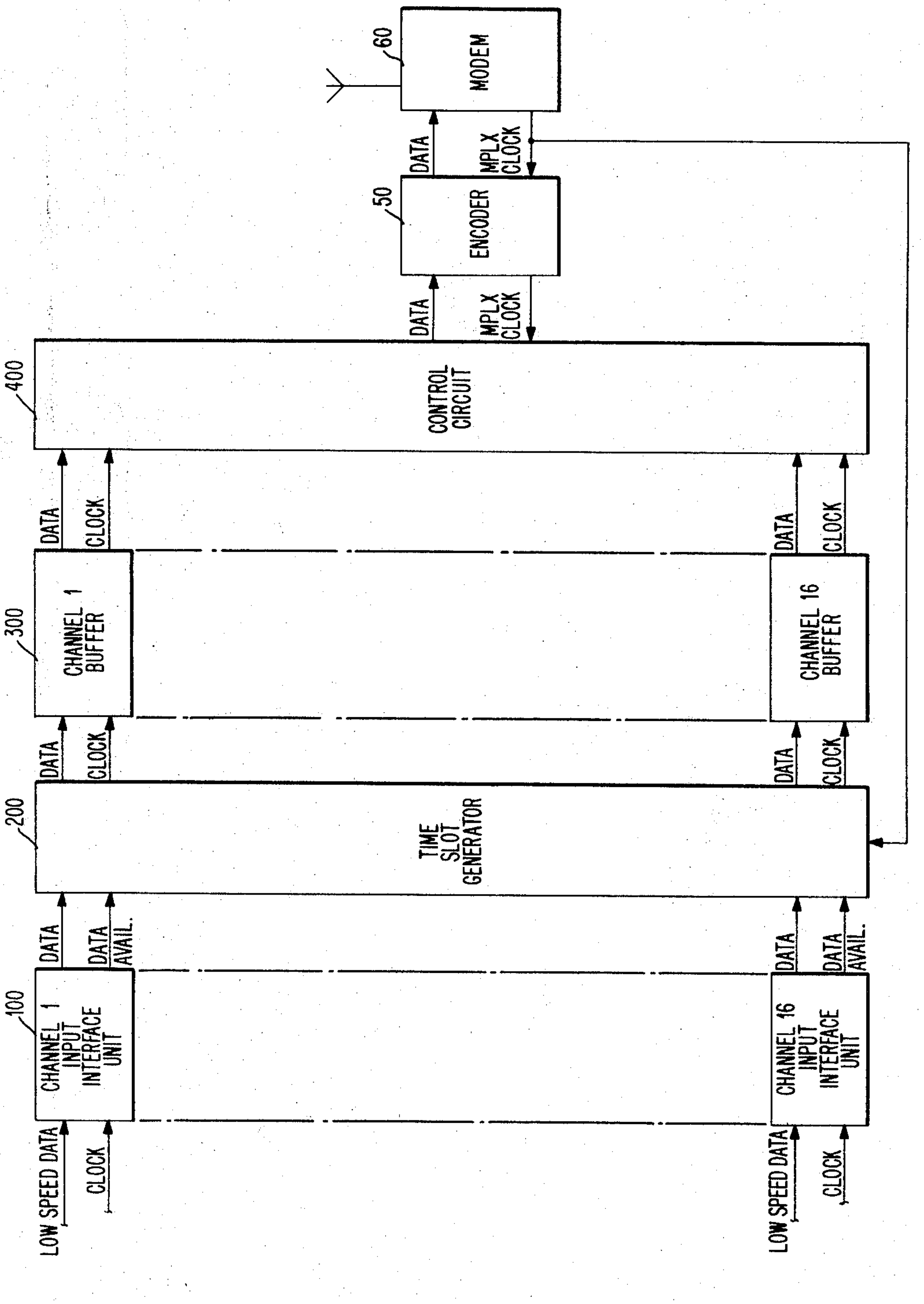
FIG. 1 is an over-all block diagram of the circuitry of our invention.

Referring now to FIG. 1, the time division multiplex communications system is shown. Low speed data at diverse rates enters the system at input interface units 100. Input interface units 100 include voltage and impedance matching circuits for converting the data into a form compatible with our system. For purpoes of illustration, 16 seaprate channels are shown in FIG. 1. Each channel is independent of any other channel, and each of input interface units 100 is matched to its corresponding channel data source for voltage level and impedance. Data entering input interface unit 100 occurs at various bit rates and any bit rate including fractional bit rates such as 42.87735644+ bits/seconds can be accommodated. For the purposes of our example, the input data is asynchronous and none of the channels operates at greater than the 70 bits/seconds. The data source for each input channel provides a corresponding clock pulse to provide mid-bit sampling of the input data.

Time slot generator 200 operates under the control of the system clock (1200 cycles/seconds). The terms "system clock" and "multiplex clock" will be used interchangeably herein. Time slot generator 200 scans each of the 16 interface units 100 in sequence. Each 1/1200 second, one of the input channels is scanned. This operation is performed in sequence so that all 16 channels are scanned once every $1/75$ second. This is represented in FIG. 3*b* where it is shown how every $1/75$ second, "time slots" $1/1200$ second in width are provided for each channel.

In order to store the data bits received on each of the 16 channels, buffer 300 is provided. Data (and dummy) bits are gated from buffer 300 into encoder 50 under the control of control circuit 400. Control circuit 400 gates information out of buffer 300 in accordance with a predetermined format determined by the known data rates of each of the 16 channels. In this way, data enters encoder 50 in the form of a single multiplexed bit stream having data and dummy bits interspersed. The multiplexed bit stream is then scrambled in encoder 50 and transmitted by modem 60. Encoder 50 and modem 60 have been shown merely to illustrate our invention in an over-all full duplex system implementation. Also, modem 60 is the source of multiplex clock pulses. Only the transmitter section of the system is shown in FIG. 1. The receiver circuit (not shown) includes a corresponding control circuit 400 wherein the multiplexing format is pre-set in an identical manner. In this way, data bits are separated from the multiplex bit stream and routed to their corresponding channels.

DETAILED DESCRIPTION

Figure 2:
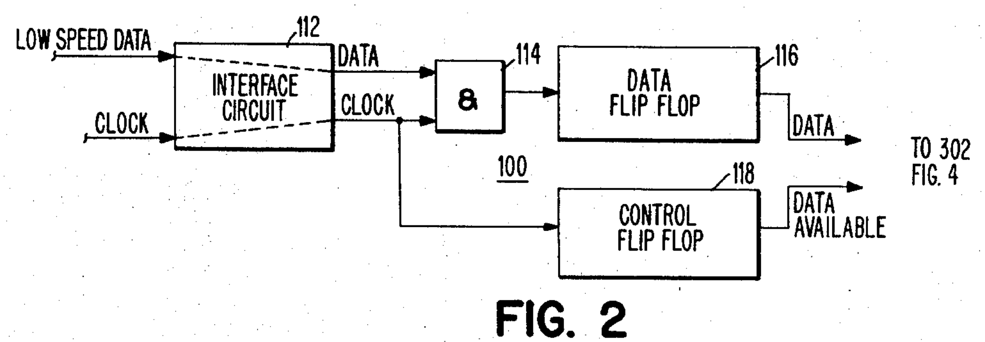
FIG. 2 is a more detailed block diagram of one of the chnanel input interface units.

Turning now to FIG. 2, circuitry for input interface unit 100 will be described. For purposes of illustration, consider the circuit of FIG. 2 as the channel 1 input interface unit. Data and the clock pulse operating at the rate of channel 1, enter interface circuit 112 as shown. Interface circuit 112 contains impedance matching and voltage level adjusting circuitry, to make the signal on the input, compatible with the system's circuits. Interface circuit 112 is connected to AND gate 114 which gates data to flip-flop 116 whenever both a clock pulse and a data pulse are present. The clocg pulse in interface circuit 112 is also connected to control flip-flop 118. The outputs of both flip-flops are connected to shift register 302 (FIG. 4).

Figure 3A:
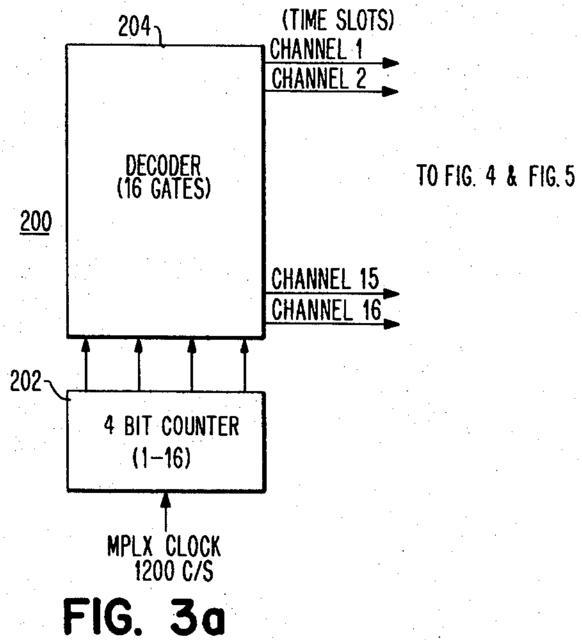
FIG. 3*a* is a more detailed block diagram of the time slot generator.
Figure 3B:
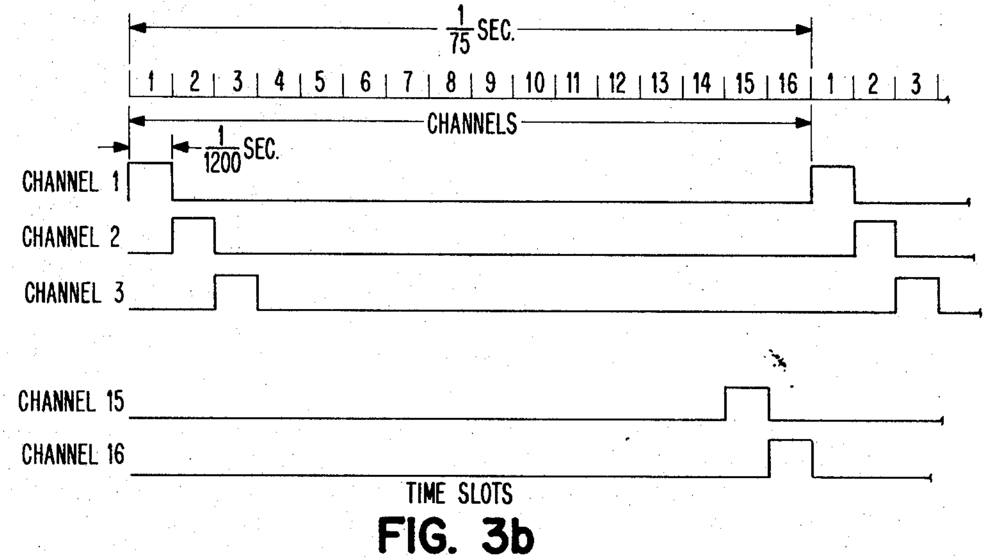
FIG. 3*b* is a timing diagram showing the time slots generated by the time slot generator.

Referring now to FIG. 3*a*, time slot generator 200 is shown. It is the function of time slot generator 200 to sequentially provide 16 time slots to each of channel buffers 300. To accomplish this function, time slot generator 200 consists of a 4-bit position counter 202 and a binary decoder 204. Four-bit counter 202 accepts an input of 1200 cycles per second from the system clock and provides at its output binary signals corresponding to the 16 channels. Binary decoder 204 includes 16 gates for decoding the signals from counter 202 and providing one time slot, $1/1200$ of a second in duration, once every $1/75$ of a second to each of the 16 channels, as shown in FIG. 3*b*.

Figure 4:
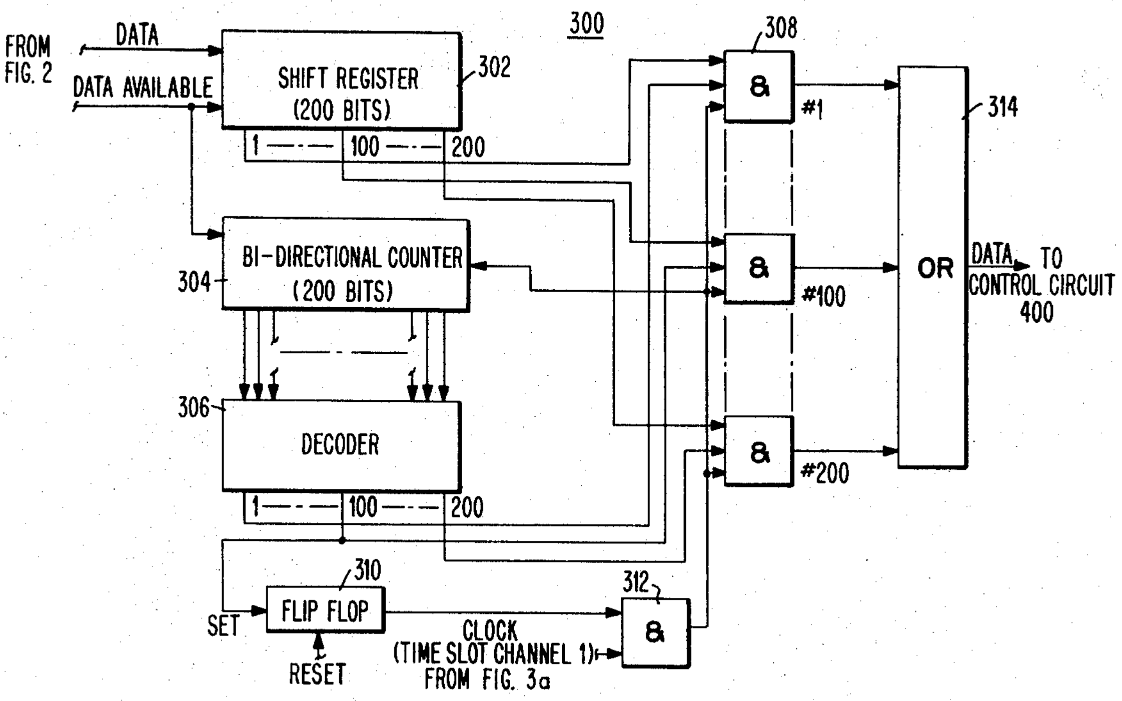
FIG. 4 is a more detailed block diagram of one of the channel buffers.

Turning now to FIG. 4, there is shown a more detailed circuit for one of the buffers 300. For purposes of illustration assume that the channel 1 buffer is shown. Buffer 300 consists of a shift register 302 which accepts data and a "data available" pulse from input interface unit 100. The "data available" pulse also enters bidirectional counter 304. Each time bidirectional counter 304 receives a pulse input on the left it counts up one, whereas a pulse input on the right causes it to count down by one. The contents of bidirectional counter 304 is decoded in decoding matrix 306 which controls gates 308 and bistable circuit means 310. For purposes of illustration a 200 bit shift register is shown merely to illustrate that the capacity of the shift register, counter, decoder, and the number of AND gates are all the same. The actual capacity needed for any given channel will be explained later herein. It should further be pointed out that although a shift register 302 is used as the storage means, any other storage means such as core storage, for example, can be used to perform the identical function. Bistable circuit means 310 is set by docoder 306 when the count in bidirectional counter 304 has reached 100. Bistable circuit means 310 is not reset until the transmission has been terminated. Accordingly, from the time that bistable circuit means (flip-flop) 310 is initially set, the time slot 1 clock pulses pass through AND gate 312 and continually gate bits from shift register 302 through AND gate 308 and OR gate 314 to control circuit 400.

The "time slot 1" pulse gate through gate 312 also acts as the decrementing pulse for bidirectional counter 304. In this way, it is assured that data is always gated from the last information containing position in shift register 302, thereby assuring bit integrity for each channel.

Figure 5:
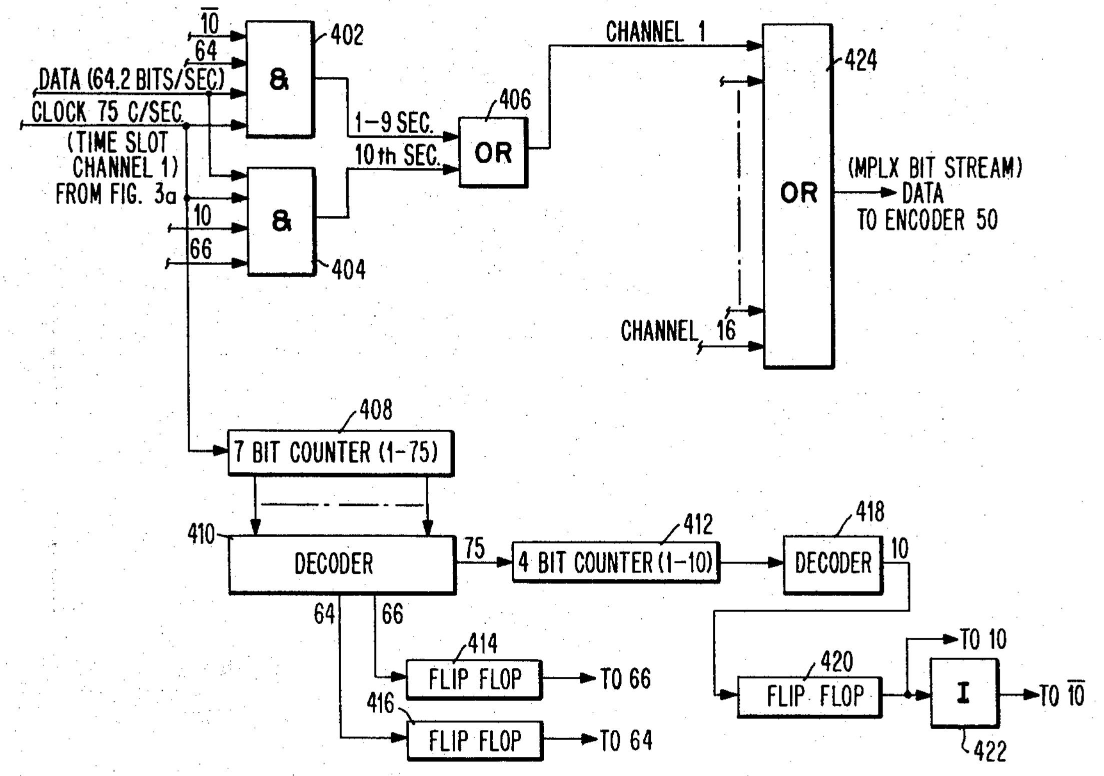
FIG. 5 is a more detailed block diagram of the control circuit for channel 1.

With specific reference to FIG. 5, control circuit 400 will now be described in detail. Input data is received into AND gates 402 and 404 which in turn are connected to OR gate 406. As in the description of the previous figures, assume that the circuit of FIG. 5 is for channel 1, for purposes of example. Circuit 400 further includes counter 408, the output of which is connected to decoder 410. Decoder 410 provides an input for counter 412 and bistable circuit means 414 and 416. Counter 412 provides an input to decoder 418 which in turn provides an input to bistable circuit means 420. Bistable circuit means 420 supplies an input to AND gate 404 and an inverted input to AND gate 402, via inverting circuit 422. The output of OR gate 406 is connected to the input of OR gate 424. OR gate 424 accepts a similar input from the other 15 channels and provides at its output a continuous multiplexed bit stream. The particular interconnections in FIG. 5 assume a data rate on channel 1 of 64.2 bits/seconds. This will be explained in greater detail below, but it is pointed out that 64.2 is used only for purposes of our example. The concept disclosed is generally applicable to all fractional bit rates as will be readily apparent.

The multiplexed bit stream is scrambled in forward error encoder 50. This illustrates one of the great advantages of our invention in that a single data stream can be scrambled by forward encoder 50 and sent over a single channel by modem 60. This is a great saving compared with sending 16 channels separately. Furthermore, our system provides additional security in that the receiving station must not only be able to decode the scrambling of encoder 50 but must also be aware of the multiplexing format of circuit 400.

OPERATION

In operation, the apparatus of our invention accepts data from a plurality of input channels. The data rate is different on each channel and each channel has its own clock. Since each input channel operates under the control of its own clock, the data rates entering the system are asynchronous and further, occur at a fractional or "oddball" rate. Data enters input interface unit 100 and each channel is processed independently through their respective channel buffer until combined into a single multiplexed bit stream by control circuit 400.

Time slot generator 200, as shown in FIG. 3*a*, receives an input from the multiplex clock which operates at 1200 cycles per second. This is the fastest clock in the system and the rate is chosen in accordance with the number of channels to be multiplexed and the rate of the fastest channel. The multiplex clock rate of 1200 cycles per second is used for 16 channels with the fastest rate of any channel being no greater than 70 bits per second. The multiplex clock pulses enter 4-bit counter 202 (FIG. 3*a*) and through decoder 204 sequentially activate the outputs of decoder 204. See FIG. 3*b* which shows how in this way 16 independent time slots each $1/1200$ second in width are provided for each channel once every $1/75$ of a second.

In this way, data is gated into shift register 302 (FIG. 4) and clock pulses accompanying said data shift the shift register whenever a new data bit is entered. The same clock pulses cause bidirectional counter to increase its contents by one as each data bit is entered into the shift register. Before transmitting, both shift register 302 and counter 304 are empty. At the beginning of a transmission interval, data begins to fill shift register 302 as bidirectional counter 304 counts the entering bits. Shift register 302 is permitted to become ½ full, for maximum buffering during the transmission interval. The 100th bit causes decoder 306 to set bistable circuit means 310 which in turn opens AND gate 312. Therefore, clock pulses (time slot 1 for channel 1) pass through to AND gate 308 and bidirectional counter 304. Thus, when both inputs to AND gate 312 are present, an output is provided to bidirectional counter 304, decrementing the counter by one, and an output is also provided to gates 308. In the present example, decoder 306 will also activate gate 100 reading the bit in the 100th position in shift register 302 into the multiplexed bit stream. This process continues as data is continually read into shift register 302 and read out of shift register 302. As previously mentioned, there are 200 AND gates 308 each having one input from the 200 outputs of decoder 306. Decoder 306 always activates the AND gate 308 corresponding to the highest count in counter 304. In this way, it is always the "oldest" bit in shift register 302 which is gated through its corresponding AND gate 308. The circuit in FIG. 4 assures that bits are always processed on a first-in, first-out basis, thereby maintaining bit integrity.

Figure 6:
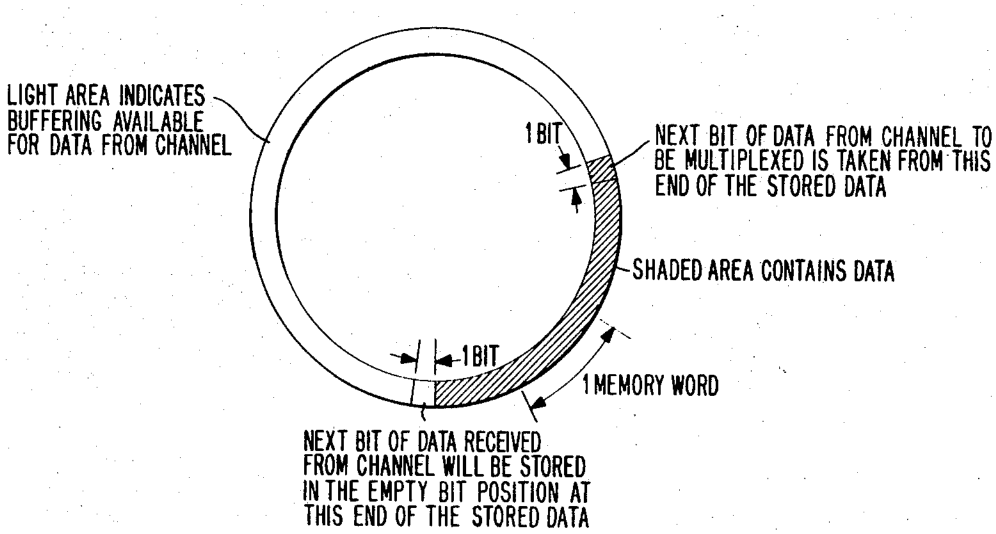
FIG. 6 is a schematic representation of the operation of one of the channel buffers.

The operation of buffer 300 can be best described by reference to FIG. 6. FIG. 6 shows a typical organization of a buffer. The actual hardware used to implement the buffer is not critical, i.e. core storage, shift registers, or any of a number of other storage devices known to those skilled in the art will perform the required function. The only requirement is that bits be transferred through buffer 300 on a first-in, first-out basis. Data is stored, as shown in FIG. 6, bit by bit at the input bit rate as it is received. Simultaneously, data is read out into control circuit 400 at a variable rate under the control of the system clock. The shaded area will rotate clockwise at approximately the input bit rate as data is simultaneously added and removed from the buffer.

Data is read from each of buffers 300 under the control of control circuit 400 at varying rates. The rates at which data is read from buffers 300 is determined by the known data rate of that particular channel. The data bits for any particular channel will therefore occupy certain fixed positions in the multiplexed bit stream. Also, these positions will be different for each different bit rate. For example, if the input data in channel 1 enters at a rate of 64.2 bits/second and if channel 1 data is transmitted in the first bit position of each 16 bit block (see FIG. 3*b*), then 64.2 bits/seconds can be expressed as a whole number over a 10 second period; i.e. 642 bits/10 seconds. During each second, 70 bit positions are available for the transmission of data from channel 1. The data pattern for this rate (64.2 bits/second) is as follows:

(1) In the first second, transmit 64 data bits followed by exactly 6 dummy bits.

(2) Repeat this for the next 8 seconds.

(3) In the 10th second, transmit 66 data bits followed by exactly 4 dummy bits.

This gives a total of 642 data bits read out of the channel 1 buffer and transmitted in 10 seconds equaling the amount of data read into this buffer in the same period of time. The process is repeated for each of the following 10 second intervals. By choosing a 100 second interval for one complete frame, all bit rates containing up to two decimal places can be expressed in terms of a whole number of bits in a given frame. For example, 4.85 bits/seconds becomes 485 bits per 100 seconds. Assuming, however, a bit rate of 4.8564 bits/seconds, then 485.64 bits are provided in a 100 second interval. Rather than extend the length of time of one multiplex frame, these additional bits are treated as clock instability. For this reason the number of bits stored in buffers 300 increases or decreases during any given transmission interval. It follows therefore that the size of each buffer 300 must be large enough to accommodate all accumulated bits.

The size of each shift register 302 is easily calculated by the formula 2RTΔ. R is the input bit rate of the particular channel. T is equal to the total length of time for the transmission interval. Δ is the portion of each bit rate beyond two decimal places. Δ can be calculated to include clock instability as well. Δ therefore is an uncertainty factor. At the beginning of the transmission interval shift register 302 is filled with RTΔ number of bits. The capacity of the shift register must therefore be 2RTΔ.

With reference to FIG. 5, control circuit 400 is shown for channel 1, interconnected for our specific example i.e. a data rate of 64.2 bits per second. As will now be explained, this circuit gates 64 bits per second for the first 9 seconds, and 66 bits during the 10th second. Looking at AND gate 402, the first input ($\overline{10}$) is activated during the first 9 seconds. Input "64" is activated for the first 64 bits during any of the first 9 seconds. Therefore OR gate 406 receives 64 bits per second during the first 9 seconds. During the 10th second, gate 402 is inhibited by input "$\overline{10}$" while input 10 to gate 404 is activated. During the 10th second, therefore, the first 66 bits will be gated through AND gate 404 through OR gate 406 into OR gate 424. As shown, OR gate 424 receives an input from each of the 16 channels during their corresponding time slot and has as its output to encoder 50, the multiplexed bit stream.

The activation of lines 10, $\overline{\mathbf{10}}$, 64, and 66 is developed as follows. The clock pulse for time slot 1 increments 7 bit counter 408, 75 times per second. Thus, during every one second interval, counter 408 counts from 1 to 75. Decoder 410 for this example has three outputs. The output labeled "64" activates bistable circuit means 416 during the count from 1 to 64. For this reason gate 402 is enabled by decoder 410 for the first 64 bits every second. Output "66" activates bistable circuit means 414 and thereby enables gate 404 during the first 66 bits in any given second. By a similar mode of operation, output "75" activates 4-bit counter 412 once every second. Every 10th second, decoder 418 activates flip-flop 420 thereby enabling gate 404 and inhibiting gate 402. An identical procedure would be followed for multiplexing any other fractional data rate. During any "time slot 1" time when no data is gated through OR gate 406, a filler (dummy) bit takes the place of the data. The location of data and dummy bits with respect to each other is determined by the particular set of interconnections used for circuit 400. For this reason a similarly interconnected control circuit is required at the receiver multiplexor for separating the data bits from the dummy bits.

Figure 7:
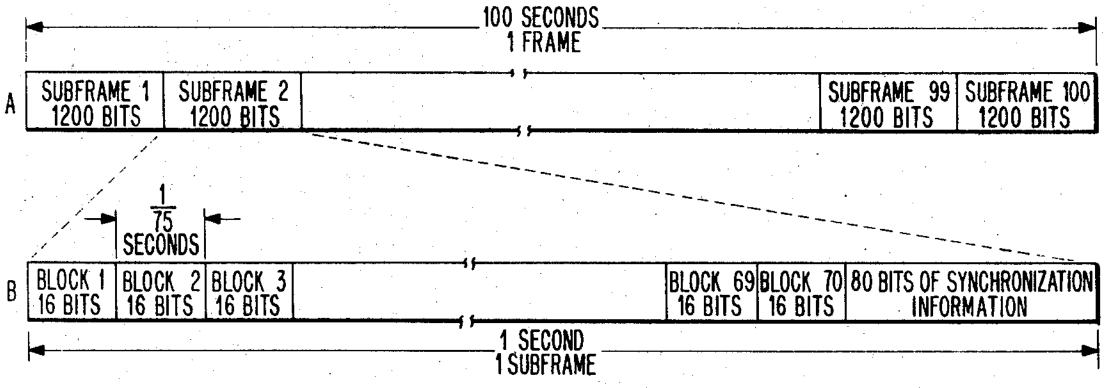
FIGS. 7*a* and 7*b* are timing diagrams.

The output of OR gate 424 is a continuous multiplexed bit stream as shown in FIG. 7*a*. Since a system clock rate of 1200 cycles per second has been assumed, in a 100 second frame there are 120,000 bits. Some of these are data bits and others are dummy bits, as explained above. Each subframe has a duration of one second and contains 1200 bits. Each subframe is broken into 75 blocks, each 1/75 second long and each block containing 16 bits. Five blocks containing 80 bits must always be reserved for synchronization information. The remaining 70 blocks are available for data and dummy bits. This corresponds to the highest data rate of any of the 16 input channels which can be a maximum of 70 bits per second. The sum of the data and dummy bits gated out of circuit 400 is therefore always 70. Each block of 16 bits includes one bit (data or dummy) from each of the 16 channels.

In conclusion, an apparatus has been disclosed with means for multiplexing data from a number of independent and asynchronously operating input channels. Furthermore, input data can occur at fractional bit rates. Our invention accepts these diverse inputs and provides a continuous multiplexed bit stream with a constant transmission rate, while at the same time maintaining bit integrity.

While the invention has been particularly shown and described with reference to a preferred embodiment, it will be understood by those skilled in the art that various changes in form and detail may be made therein without departing from the spirit and scope of the invention.

We claim:

1. A time division multiplexed communications system for accepting data from a plurality of data sources and for transferring said data to a single time divided communications link comprising:

a plurality of buffers, one for each said data sources, for accepting data at a first data rate, each of said buffers comprising:

shift register means for storing the data;

bidirectional counting means for counting each bit of data received into said shift register means;

decoding means responsive to said bidirectional counting means for providing an output on a line corresponding to the highest count in said counting means;

a source of clock pulses; and a plurality of gating means, one for each position in said shift register means, responsive to said decoding means and said source of clock pulses;

whereby during each occurrence of said clock pulses, a bit of data is gated from said shift register means through one of said plurality of gating means and, simultaneously, said counting means is decremented by one in response to one of said clock pulses; and control means for assigning a time slot to each of said buffers, and for reading the data from each of said buffers sequentially at a second data rate, thereby transferring said data to the single time divided communications link at said second rate.

2. A time division multiplex communications system for multiplexing a plurality of data channels, onto a continuous multiplexed bit stream, the data occurring at fractional bit rates, comprising:

a source of clock pulses occurring at the rate of the multiplexed bit stream;

time slot generating means, responsive to said source of clock pulses, for generating time slots for each of said data channels;

a plurality of storage means, one for each of said data channels, for accepting data at the rate of its corresponding data source during a time slot provided by said time slot generating means; and control circuit means responsive to said data source and to said source of clock pulses, for gating data from each of said plurality of storage means onto a single time-divided communications link, at the rate of said source of clock pulses.

3. An apparatus as in claim 2 wherein said time slot generating means comprises:

counting means responsive to said source of clock pulses; and decoding means responsive to said counting means for providing time slot pulses sequentially on a plurality of outputs.

4. An apparatus as in claim 2 wherein each of said plurality of storage means comprises:

shift register means for storing the data;

bidirectional counting means for counting each bit of data received into said shift register means;

decoding means responsive to said bidirectional counting means for providing an output on a line corresponding to the highest count in said counting means;

a source of clock pulses; and a plurality of gating means, one for each position in said shift register means, responsive to said decoding means and said source of clock pulses;

whereby during each occurrence of said clock pulses, a bit of data is gated from said shift register means through one of said plurality of gating means and, simultaneously, said counting means is decremented by one in response to one of said clock pulses.

5. An apparatus as in claim 2 where for each channel of data, said control circuit means comprises:

first counting means responsive to said source of clock pulses;

first decoding means connected to said first counting means for developing output signals in accordance with a predetermined format and in response to certain values of count in said first counting means;

second counting means responsive to said first decoding means;

second decoding means responsive to said second counting means for developing output signals in accordance with a predetermined format and in response to certain values of count in said second counting means; and a plurality of gating means responsive to both of said decoding means and also to said source of clock pulses for gating data to a second plurality of gating means onto a single time divided communications link, at the rate of said source of clock pulses.

References Cited

UNITED STATES PATENTS

| | | | |
|---|---|---|---|
| 3,288,928 | 11/1966 | Bartlett et al. | 178—50 |
| 3,310,779 | 3/1967 | Wagner | 179—15 XR |
| 3,312,950 | 4/1967 | Hillman et al. | 340—172.5 |
| 3,366,737 | 1/1968 | Brown | 179—15 XR |

RAULFE B. ZACHE, Primary Examiner

U.S. Cl. X.R.

178—50; 179—15